UNITED STATES PATENT OFFICE.

LEWIS FRANCIS, OF NEW YORK, N. Y., ASSIGNOR TO LEWIS FRANCIS AND CYRUS H. LOUTREL.

IMPROVED COMPOSITION FOR MAKING PRINTERS' INKING-ROLLERS.

Specification forming part of Letters Patent No. 41,887, dated March 8, 1864; Reissue No. 1,771, dated September 27, 1864.

DIVISION A.

*To all whom it may concern:*

Be it known that I, LEWIS FRANCIS, of New York, in the county and State of New York, have invented, made, and applied to use a new and useful Composition for the Manufacture of Printers' Inking-Rollers; and I do declare the following to be a full, clear, and correct description thereof.

The nature of my invention consists in combining an alkali or alkalies, or alkaline earths, or any of their compounds with glue and glycerine, to form a composition from which printers' inking-rollers of a superior character can be made.

To enable those skilled in the arts to make and use my invention, I will describe the manner in which I manufacture my improved composition.

In making my improved composition the ingredients are employed in about the following proportions: glue, fifteen (15) pounds; glycerine, thirty-two (32) pounds; borax, eight (8) ounces; ammonia, four (4) ounces. The glue is first soaked in water for about five minutes, in order that it, (the glue,) when added to the glycerine, may be thoroughly incorporated with it. In many cases I prefer dissolving a certain quantity of lime in the water in which the glue is to be soaked prior to soaking the glue therein. The glycerine is placed in a steam kettle and heated to a temperature of about 200° Fahrenheit, and the glue and glycerine and alkali or alkalies employed are united by gradually adding the glue and alkali or alkalies to the glycerine, the latter being kept well stirred until all the ingredients have been added and thoroughly incorporated with the glycerine.

The composition thus formed may be cast into thin sheets or cakes of any desired form. The sheets or cakes are exposed to the air several days, in order that any water remaining in the composition may be thoroughly evaporated, or a vacuum-pan may be used for the same purpose.

The peculiar advantages I would claim for my invention are that rollers made from it never lose their suction or become hard or dry; that rollers made from it will not shrink; that rollers made from it last very much longer than the ordinary glue-and-molasses roller, and, when desirable, can be remelted and recast, thus enabling the printer to use my composition repeatedly in the manufacture of rollers, which is not the case with the composition now in use.

I do not wish to be understood as intending to confine myself to the use of the ingredients employed by me in the proportions herein set forth, as in some cases it may be necessary to vary these proportions.

Having thus described my invention, what I claim as new, and desire to secure by Letters Patent, is—

Combining an alkali or alkalies, or alkaline earths, or any of their compounds with glue and glycerine, to form a composition for the manufacture of printers' inking-rollers.

LEWIS FRANCIS.

In presence of—
A. SIDNEY DOANE,
FRANK C. VAN TASSELL.